United States Patent [19]

Dzenitis et al.

[11] Patent Number: 5,279,482
[45] Date of Patent: Jan. 18, 1994

[54] FINGERED BOLA BODY, BOLA WITH SAME, AND METHODS OF USE

[75] Inventors: John M. Dzenitis, Seabrook; Linda W. Billica, Houston, both of Tex.

[73] Assignee: The United States of America as represented by the Administrator of the National Aeronautics and Space Administration, Washington, D.C.

[21] Appl. No.: 892,053

[22] Filed: Jun. 5, 1992

[51] Int. Cl.⁵ .................................................. B64G 1/64
[52] U.S. Cl. ............................... 244/161; 294/86.1; 294/66.1; 273/84 R; 102/504
[58] Field of Search ............... 244/161, 158; 102/504; 89/36.16, 14.05, 1.11, 1.1; 124/5, 1, 83, 52; 273/84; 294/86.1, 66.1; 114/294

[56] References Cited

U.S. PATENT DOCUMENTS

| | | | |
|---|---|---|---|
| D. 118,869 | 2/1940 | Tower | 114/294 |
| 64,729 | 5/1867 | Wood. | |
| 1,151,070 | 8/1915 | Victory | 102/504 |
| 2,184,802 | 12/1939 | Milavec | 102/504 |
| 2,373,363 | 4/1945 | Wellcome | 102/504 |
| 2,841,916 | 7/1958 | Ueda | 114/294 |
| 3,330,510 | 7/1967 | Johnson | 244/138 |
| 4,083,520 | 4/1978 | Rupp et al. | 244/167 |
| 4,712,753 | 12/1987 | Howard | 244/161 |
| 4,750,692 | 6/1988 | Howard | 244/158 R |

FOREIGN PATENT DOCUMENTS

| | | | |
|---|---|---|---|
| 495841 | 10/1919 | France | 102/504 |
| 169076 | 7/1934 | Switzerland | 102/504 |

Primary Examiner—Galen L. Barefoot
Attorney, Agent, or Firm—Russell E. Schlorff; Guy M. Miller; Edward K. Fein

[57] ABSTRACT

A bola body, a bola, and methods employing such bola bodies and bolas; in one aspect a bola body having a non-spherical body member from which extend one or more fingers for entanglement with a bola line, with each other, or for latching onto part of a target body.

2 Claims, 3 Drawing Sheets

FINGERED BOLA BODY, BOLA WITH SAME, AND METHODS OF USE

ORIGIN OF THE INVENTION

The invention described herein was made by employees of the United States Government and may be manufactured and used by or for the Government of the United States of America for governmental purposes without the payment of any royalties thereon or therefor.

BACKGROUND OF THE INVENTION

1. Field of the Invention

This invention is directed to: bola bodies and to bolas; in one particular aspect to fingered bola bodies and bolas with such bodies; in one specific aspect to such bodies and bolas which are particularly useful in areas of low or zero gravity, including but not limited to outer space; and in one aspect for extravehicular activity crew rescue in outer space.

2. Description of Related Art

The prior art discloses a variety of bolas for use in a gravity environment, including the well-known bola comprising a string or thong with a weight or ball at either end. Bolas with multiple strings and a plurality of weights, balls, or sacks are also well-known for use on earth.

U.S. Pat. No. 64,729 discloses a hook lifting device intended for the removal of hay from a cart which has a line with three cords, each having a hooked end. The hooked ends collect loose hay which is retrieved or rolled by pulling the main line. The device is not intended to be used as a bola.

U.S. Pat. No. 3,330,510 discloses a system for astronaut self rescue. The astronaut abandons ship using an orbital lifeboat. In operation, the astronaut leaves the orbiting vessel and enters an inflatable housing which is padded with heat-resisting material and energy-absorbing material. The housing reenters the atmosphere with the astronaut inside.

U.S. Pat. No. 4,083,520 discloses a tethering line used to connect two orbiting vessels, a main vessel (space shuttle) with a motor to control one end of the tether and a second vessel, e.g. a satellite.

U S. Pat. No. 4,712,753 discloses the basic principle of casting a line from one orbiting object toward a second orbiting object. The projectile has arms that spin and Velcro TM straps are attached to the ends of these arms. When contact is made with the object to be retrieved, the Velcro TM straps become entwined and secure the attachment. The satellite is then retrieved.

U.S. Pat. No. 4,750,692 discloses a variation of the U.S. Pat. 4,712,753 where the attachment means are in the form of an oscillating loop.

FIGS. 1A, 1B, and 1C illustrate a prior art bola B having a main tether line L, secondary lines S, and balls, sacks or weights W. As shown in FIG. 1A the bola B has been cast at a target pole T. As shown in FIG. 1B the weights W have commenced wrapping the secondary lines around the target pole T. In FIG. 1C tension has been applied to the tether line L tightening the lines S around the target pole T.

Although prior art bolas may work on earth since gravity helps to inhibit or prevent the unwrapping of bola lines from around an object, reduced gravity test indicate they quickly unwrap upon being pulled while in reduced gravity.

There is a need for a bola which will effectively wrap around a target body and which will remain wrapped around it. There is a need for such a bola which will perform in areas of reduced or zero gravity. There is a need for a device which can be quickly deployed in outer space to contact and hold a target body and which is not easily detached or loosened. There is a need for an effective yet simple extra vehicular crew rescue device which is reliable.

SUMMARY OF THE PRESENT INVENTION

The present invention teaches bola bodies, bolas, and snaring methods which use such devices. In one embodiment a bola body according to the present invention is non-spherical or irregular in shape rather than a smooth sphere or ovoid body. One or more rods, fingers or finger portions extends from the bola body. These rods, fingers, or finger portions may be relatively straight or they may have crooked or bent portions to enhance entanglement with a bola line or lines or with each other. Two or more of such rods, fingers, or finger portions may be used and may be regularly or irregularly spaced apart on a bola body. A bola with such a body or bodies according to this invention includes a line or lines to which are connected one or more of such bodies. In one particular embodiment of a bola body according to the present invention the body has an irregular shape with a bottom rectangular portion and a top pyramidal portion forming a "nose." A plurality of fingers or rods, e.g. but not limited to four rod-shaped fingers, extend from the pyramidal top portion with one finger extended up and away from each of four corners of the top portion. Such a bola body tends to be initially oriented with its nose and fingers against an object being snared since the body is pulled nose first when a bola line is secured at the top of the top pyramidal portion of the bola body. With such a bola an unwrapping bola body can slip around a target member so that two of the rod-shaped fingers catch a bola line and guide it into an area or "crook" between the fingers and a side of the top pyramidal portion of the bola body. Tension on the bola line maintains the line in the crook and tends to press the fingers against the unwrapped target member to stabilize the wrapping of the line about the target member. With such a bola it is difficult for two or more lines unwrapping in different directions to move past one another without being forced together by line tension. Also, the fingers of such bola bodies may hook and hold each other. The fingers may also hook or entangle some object on or portion of the target member.

In certain specific embodiments of bola bodies and bolas according to the present invention, a probable known target member has known dimensions and shapes so that a bola may be sized and configured to reliably snare such a known target. For example, if the probable known target is a cylindrical truss member about two inches in diameter, finger and nose spans are chosen to encourage a "nose-in" (nose towards target) orientation. Fingers that are too long may tend to orient the bola body sideways instead of nose-in. In such a preferred embodiment fingers about two and a half inches long at about seventy-five degrees from a top pyramidal surface are most preferred.

It is, therefore, an object of at least certain preferred embodiments of the present invention to provide:

New, useful, unique, efficient, and effective bola bodies, bolas, and snaring methods employing such bola bodies and bolas;

Such devices which inhibit or prevent bola unwrapping from a target;

Such devices which guide and hold bola lines to prevent unwrapping;

Such devices which become easily entangled with targets or with each other;

Such bola bodies which can become easily entangled with each other and which are not easily freed from each other;

Such bola bodies which can snare a target without line wrapping around the target; and Such devices which can be optimally sized, fashioned, and configured to contact and hold a probable target of known size, dimensions, and shape.

The present invention recognizes and addresses the previously-mentioned problems and needs and provides a solution to those problems and a satisfactory meeting of those needs in its various possible embodiments and equivalents thereof. To one of skill in this art who has the benefits of this invention's realizations, teachings and disclosures, other and further objects and advantages will be clear, as well as others, inherent therein, from the following description of presently-preferred embodiments, given for the purpose of disclosure, when taken in conjunction with the accompanying drawing. Although these descriptions are detailed to insure adequacy and aid understanding, this is not intended to prejudice that purpose of a patent which is to claim an invention no matter how others may later disguise it by variations in form or additions of further improvements.

DESCRIPTION OF THE DRAWINGS

So that the manner in which the above-recited features, advantages and objects of the invention, as well as others which will become clear, are attained and can be understood in detail, more particular description of the invention summarized above may be had by reference to certain embodiments thereof which are illustrated in the appended drawings, which drawings form a part of this specification. It is to be noted, however, that the appended drawings illustrate certain preferred embodiments of the invention and are therefore not to be considered limiting of its scope, for the invention may admit to other equally effective equivalent embodiments.

DESCRIPTION OF EMBODIMENTS PREFERRED AT THE TIME OF FILING FOR THE PATENT

Figure 2:
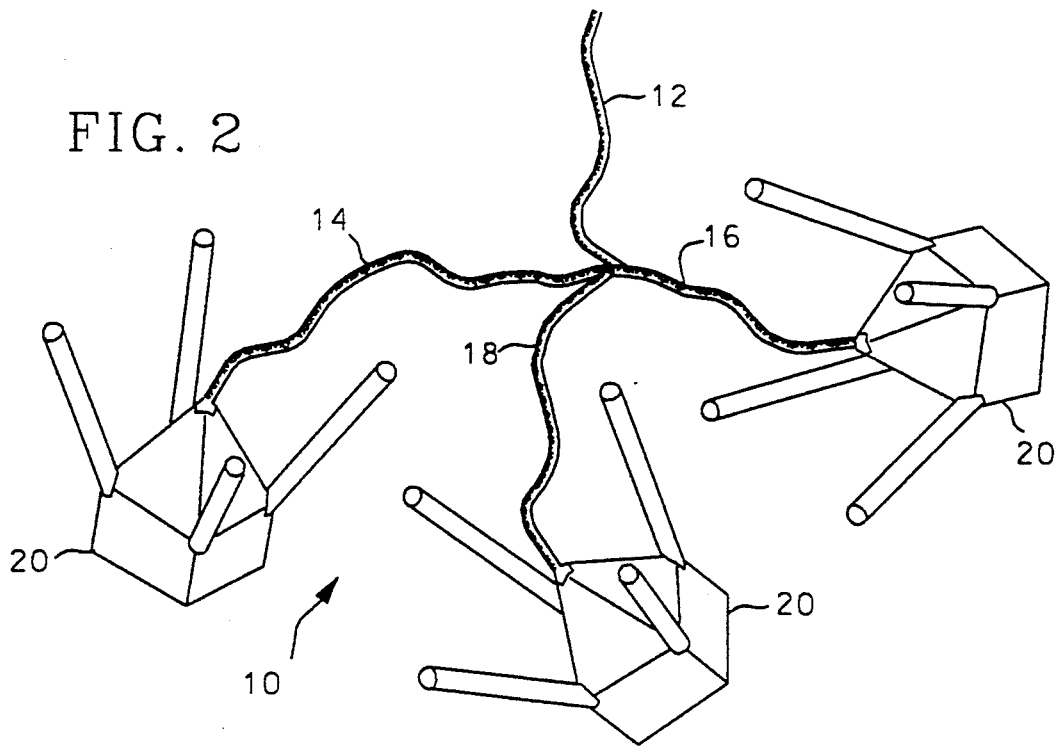
FIG. 2 is a perspective view of a bola with bola bodies according to the present invention.

Referring now to FIG. 2, a bola 10 according to the present invention has a main bola line 12 and secondary bola lines 14, 16, and 18 which extend to and are connected to bola bodies 20 according to the present invention. For use in a reduced gravity or zero gravity environment it is preferred that: the main line 12 range between about 5 and about 10 meters in length; the secondary lines range between about 0.4 and about 0.7 meters in length; and the bola bodies have a mass ranging between about 0.15 and about 0.45 kilograms. Although FIG. 2 shows a bola with three bola bodies, it is within the scope of this invention to have a bola with one or more bodies according to this invention. An even number of bola bodies, e.g. two or four, has worked best in reduced gravity tests, but the use of four bola bodies resulted in more tangling problems than the use of two bodies. In one preferred embodiment intended to snare a truss member about two inches in diameter the main line is about six meters long, the secondary lines are about a half meter long, and there are two bola bodies each with a mass of about two-tenths of a kilogram.

Design considerations for the length of the main line include the reasonableness of a rescue distance versus tangling problems; for the length of the secondary line, desired capture envelope versus tangling problems; and for the body mass, large momentum versus the need for low-mass items to be sent into space.

Figure 3:
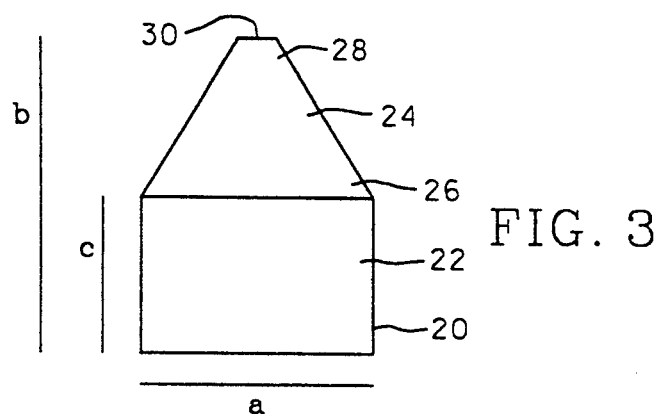
FIG. 3 is a side view of a bola body of FIG. 2.
Figure 4:
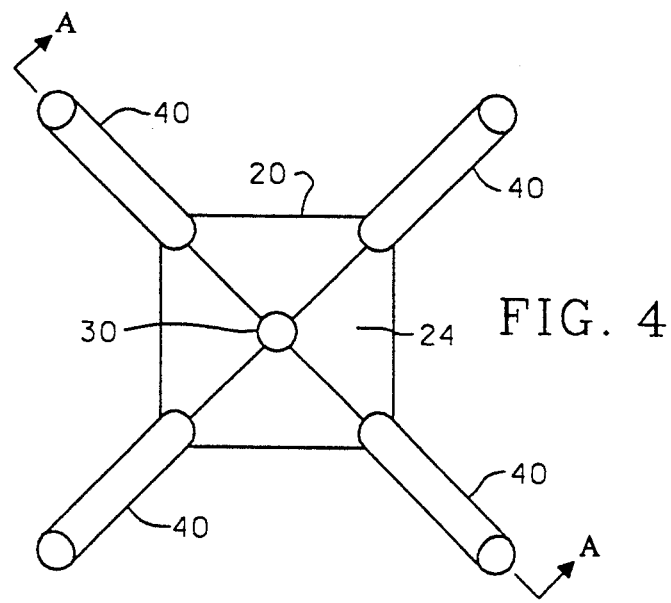
FIG. 4 is a top view of a bola body of FIG. 2.
Figure 5:
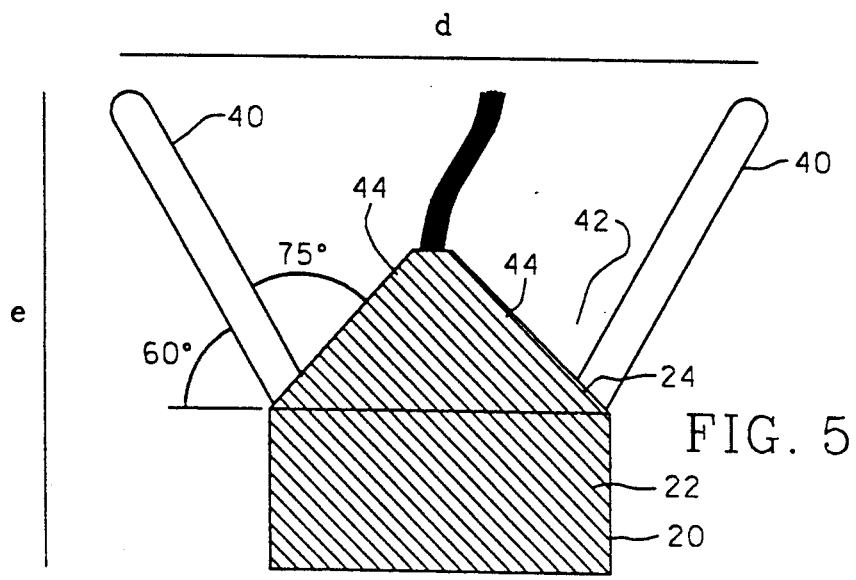
FIG. 5 is a side cross-sectional view of along line A—A of FIG. 4

Referring now to FIGS. 3,4 and 5, one of the bola bodies 20 has a lower body portion 22 and an upper body portion 24. In one preferred embodiment the upper body portion 24 is a "nose" portion with a base 26 which is larger than a top 28. In the embodiment shown in FIGS. 3,4, and 5 the upper body portion 24 is a pyramid with equal sides and a circularly truncated apex 30 and the lower body portion 22 is a rectangular solid from which the pyramid extends.

As shown in FIGS. 4 and 5, a plurality of fingers 40 are formed integrally of or are secured to the bola body 20. Holes may be drilled into the bola body into which fingers are inserted. Nails pounded into the holes and covered with rubber may serve as the fingers. In another embodiment the bola bodies are aluminum and drilled/tapped holes in the bodies receive threaded aluminum rods which serve as fingers. It is within the scope of this invention to utilize one or more of such fingers; for them to extend from any point on the bola body; and for them to extend from the bola body at any desired angle to any surface of the bola body. In the embodiment shown in FIGS. 2,4 and 5, the fingers 40 extend from each of four lower corners of the pyramidal upper body portion 24. The secondary line is attached e.g. by drilling a hole in the apex 30 through the lower body portion 22. The lines is passed through the hole and knotted outside the lower body portion. The knot can be positioned in a recess in the lower body portion. The secondary line is attached to the apex 30 and thus is positioned between the four fingers 40.

As shown in the embodiment of FIG. 5, the fingers 40 form a capture area or "crook" 42 with the exterior surfaces of the pyramidal nose upper body portion 24. The embodiment of FIG. 5 shows fingers 40 designed for enhanced finger interaction. The fingers are at an angle of about 75 degrees from a pyramid surface 44 (a preferred range for this angle is between about 45 degrees and about 80 degrees) and about 60 degrees from a horizontal line extending from the base of the upper body portion 24 (a preferred range for this angle is between about 45 degrees and about 75 degrees).

Figure 1A:
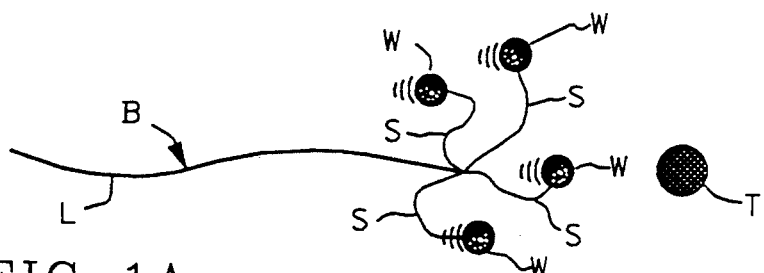
FIG. 1A is a schematic view in cross-section of a prior art bola.
Figure 1B:
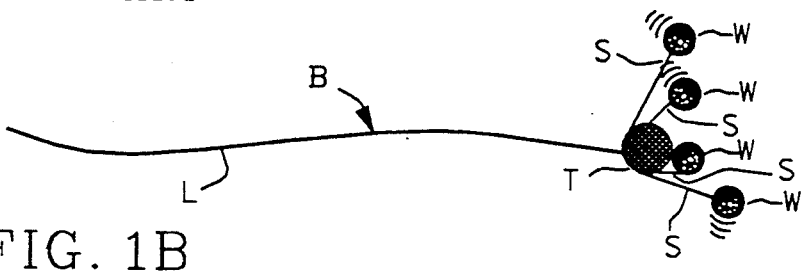
FIG. 1B is another schematic view of the bola of FIG. 1.
Figure 1C:
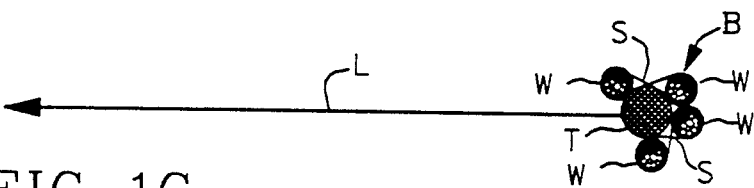
FIG. 1C is another schematic view of the bola of FIG. 1.

With a particular target in mind particular dimensions and configurations of a bola according to For example, if the target is a truss member which is about 2 inches in diameter, then a bola body with a square base (line a, FIG. 1) about 1½ inches long and 1½ inches wide, with a lower body portion height (line c, FIG. 1) of about 1 inch and a total height (line b, FIG. 1) of about 2 inches has worked well in a reduced gravity environment. Also in such an environment a bola body with four fingers, each about one fourth of an inch in diameter and about two inches long has proven to produce good results. As shown in FIG. 5 it is also desirable for this particular bola that the vertical distance from the bottom of the lower body member to the tip of the fingers (line e, FIG. 5) be about 3 inches and the distance between finger tips (line d, FIG. 5) be about 4 inches. Such a bola body will move generally nose first while a line is being wrapped around a target.

Figure 6A:
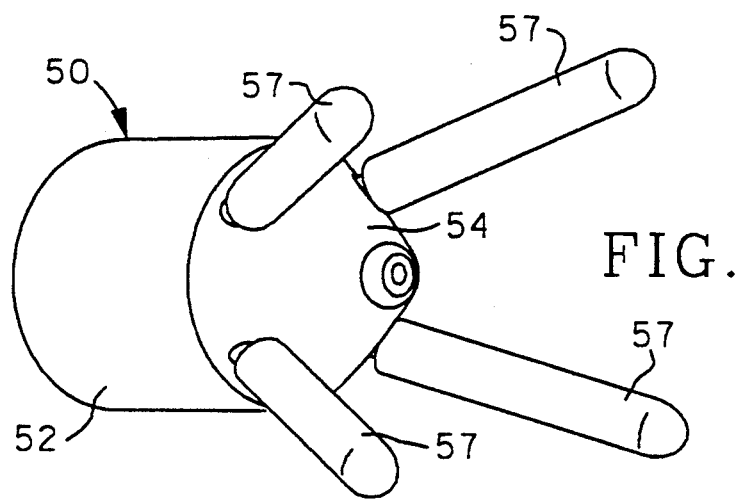
FIG. 6A is an end perspective view of a bola body according to the present invention.
Figure 6B:
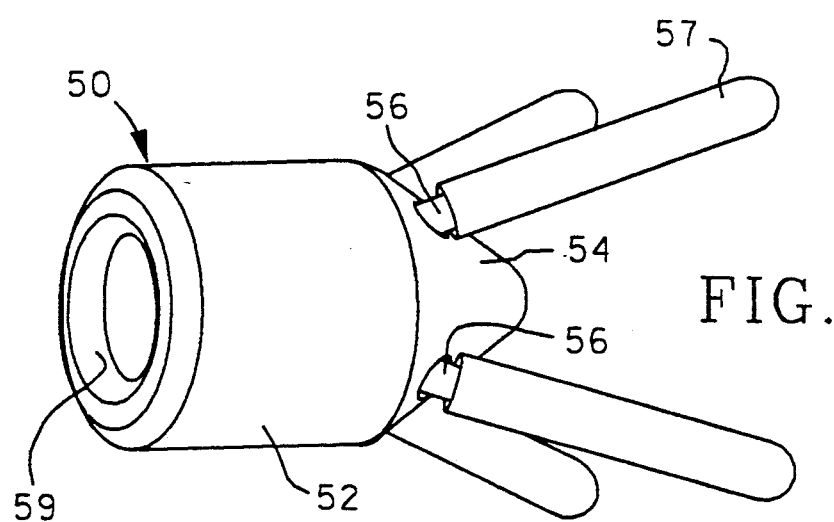
FIG. 6B is a view of another end of the bola body of FIG. 6A.

FIGS. 6A and 6B show another embodiment of a bola body 50 according to this invention. The bola body 50 has an upper conical nose portion 54 and a lower cylindrical body portion 52. A plurality of fingers 56 covered with rubber 57 are secured, e.g. by threaded engagement, in holes 58 in the upper conical nose portion 54. The lower body portion has a circular recess 59 therein.

In a method according to the invention bolas as previously described are thrown in a reduced or zero gravity environment by a person starting with both hands in front of the chest, palms out, with one bola in each hand. They are lightly thrown by extending the arms and releasing the bolas toward a target (e.g. by a crew member in outer space at a space station truss body). The bola bodies move toward the target. The bola bodies go on either side of the target and, as the secondary lines contact the target, the bola bodies secondary lines contact the target, the bola bodies wrap the secondary lines (and possibly some of the main line) around the target. While wrapping, the bola bodies assume a general nose-first (nose towards target) orientation. If unwrapping of the lines commences, fingers on the bola bodies catch and then guide the lines into the crook between the fingers and the body's nose surfaces, thus inhibiting further unwrapping. The lines are maintained in the crooks by applying tension on the lines. This also tends to press the fingers more firmly against the target providing a stable wrap. Two or more of the bola-line-body combinations meeting during unwrapping can become enmeshed and entangled so that they do not move past each other, further stabilizing the wrapping of the bola about the target. It is also possible for the fingers of one bola body to hook the fingers of another bola body or for the fingers of a bola body to hook a part of the target.

A method as described is particularly effective in a reduced or zero gravity environment.

In conclusion, therefore, it is seen that the present invention and the embodiments discussed and disclosed herein and those covered by the appended claims are adapted to carry out the objectives and obtain the ends set forth. Certain changes can be made in the described and the claimed subject matter without departing from the spirit and the scope of this invention. It is realized that changes are possible within the scope of the invention and it is further intended that each element or step recited in any of the following claims is to be understood as referring to all equivalent elements or steps. The following claims are intended to cover the invention as broadly as legally possible in whatever form its principles may be utilized.

What is claimed is:

1. A self-rescue device for an astronaut working in reduced gravity outside a space vehicle having a plurality of cylindrical truss members, said device comprising:
    a tether line,
    a plurality of bolas, each having a nose portion and a body portion, the body portion being rectangular and the nose portion being pyramidal,
    a plurality of bola lines attached to the tether line and extending through the nose portion of the bolas, and
    the nose portion of each bola being provided with four angularly extending fingers one finger extending from each corner of the pyramidal nose portion past the apex thereof and being at an angle of between about 45 degrees to about 80 degrees to the surface of the pyramidal nose portion whereby there will be entanglement with its bola line, the bola line of another bola when the bolas wrap around a truss member thereby preventing disengagement thereof when tension is applied to the tether line.

2. A method for effecting the rescue of an untethered astronaut who is floating away from a space vehicle having a plurality of cylindrical truss members, said method comprising:
    a self-rescue device comprising a tether line, the tether line having a plurality of bolas attached thereto by secondary lines, each bola having a body portion and a nose portion and a plurality of angularly extending fingers projecting from the juncture of the body and nose portion and extending past the nose portion;
    the astronaut manually moving the self-rescue device in the direction of a truss member of the space vehicle;
    the bolas wrapping themselves about the truss member;
    the projecting fingers of each bola engaging the secondary line of the bola, the secondary line of another bola, or the tether thereby securing the bolas about the truss member; and
    the astronaut applying tension to the tether while moving toward the space vehicle.

* * * * *